Oct. 18, 1927.  1,645,880
J. M. STRANG
PERISCOPE, TELESCOPE, AND LIKE OBSERVATIONAL INSTRUMENT
Filed Oct. 29, 1924   5 Sheets-Sheet 1
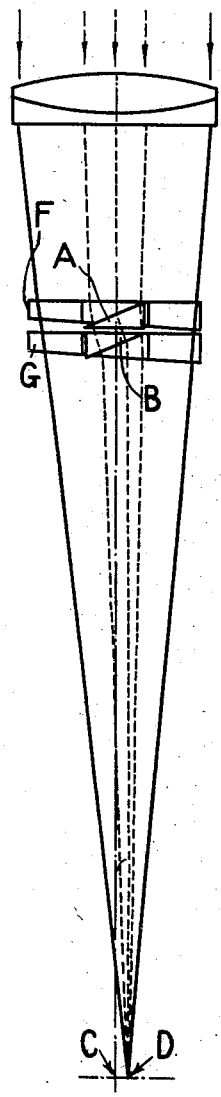
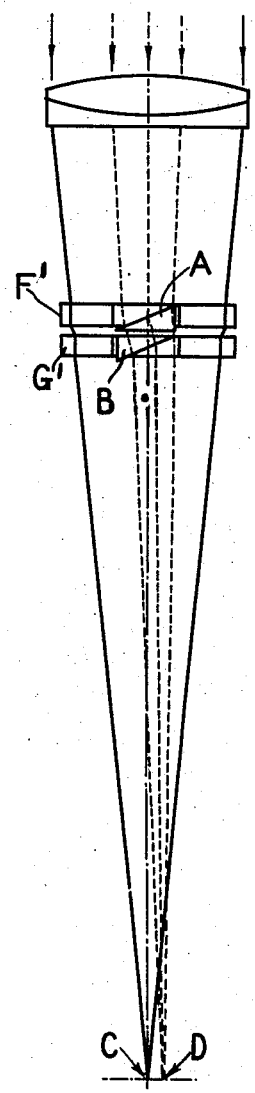
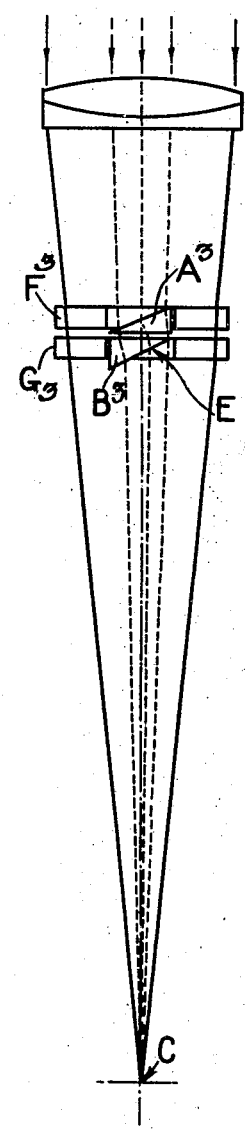
INVENTOR
John M. Strang
BY
William A. Smith, Jr.
ATTORNEY Oct. 18, 1927. 1,645,880
J. M. STRANG
PERISCOPE, TELESCOPE, AND LIKE OBSERVATIONAL INSTRUMENT
Filed Oct. 29, 1924   5 Sheets-Sheet 2
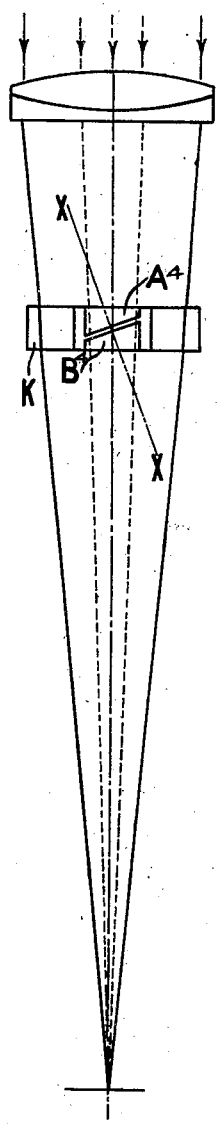
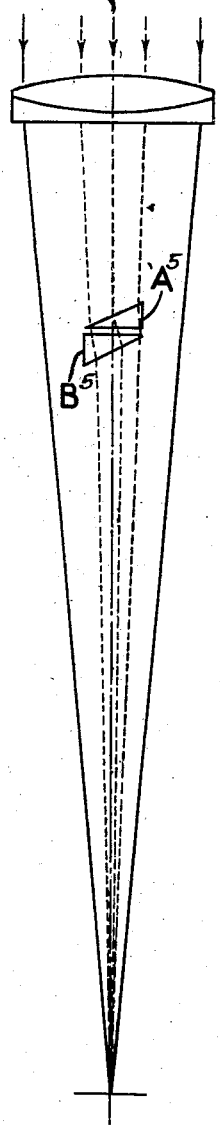
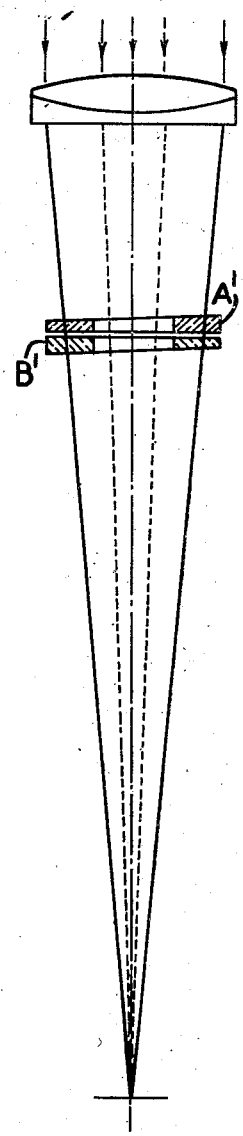
INVENTOR
John M. Strang
BY
William A. Smith, Jr.
ATTORNEY

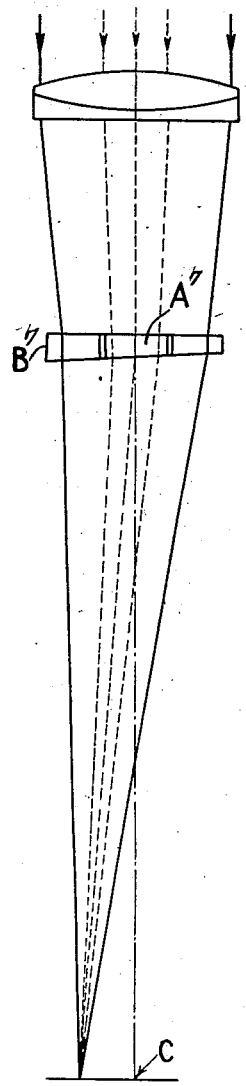
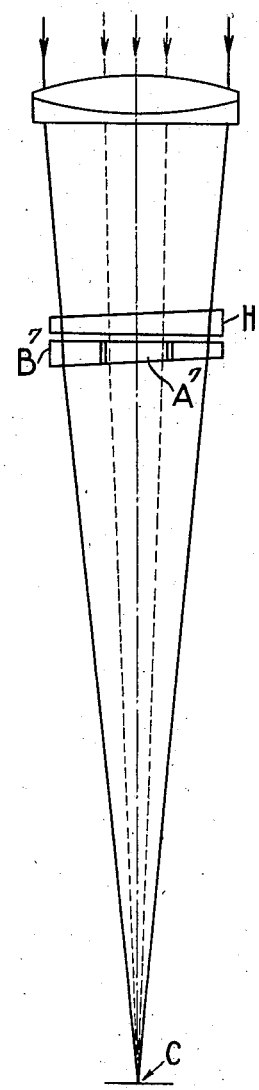
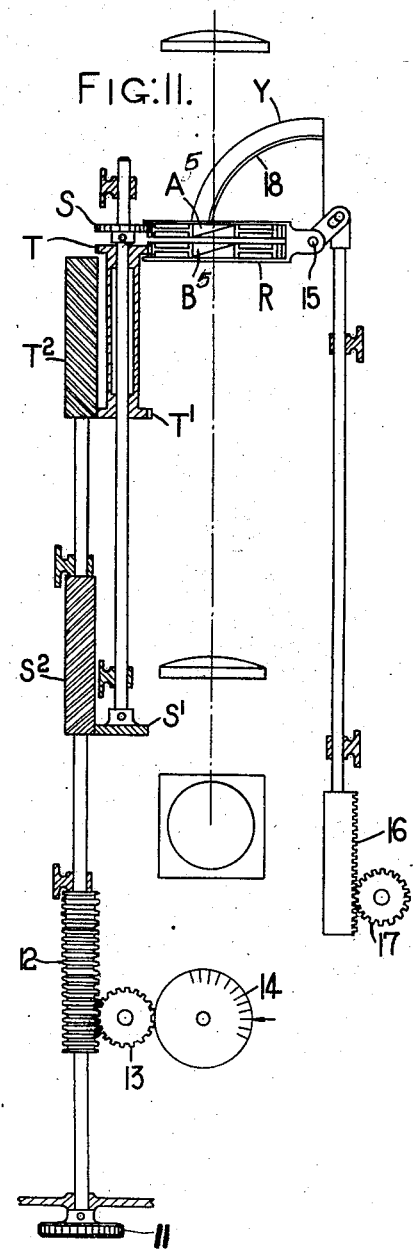

Oct. 18, 1927.
J. M. STRANG
1,645,880
PERISCOPE, TELESCOPE, AND LIKE OBSERVATIONAL INSTRUMENT
Filed Oct. 29, 1924    5 Sheets-Sheet 4
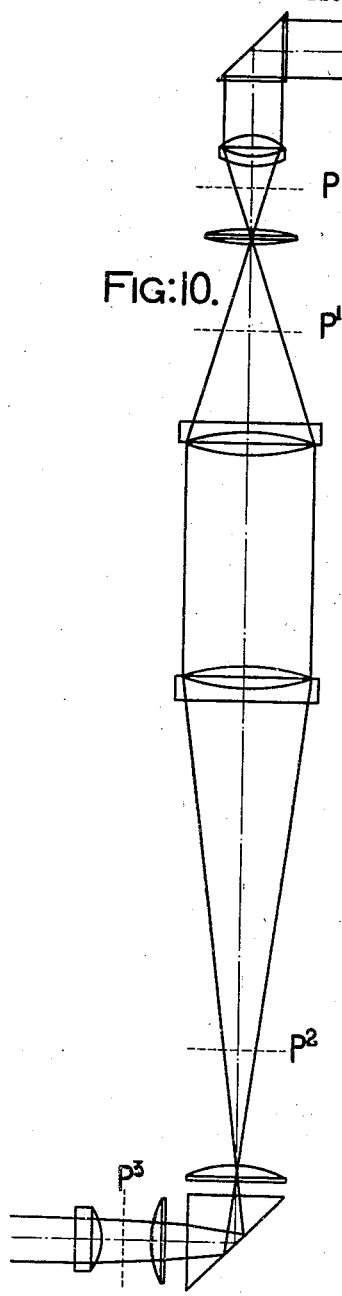
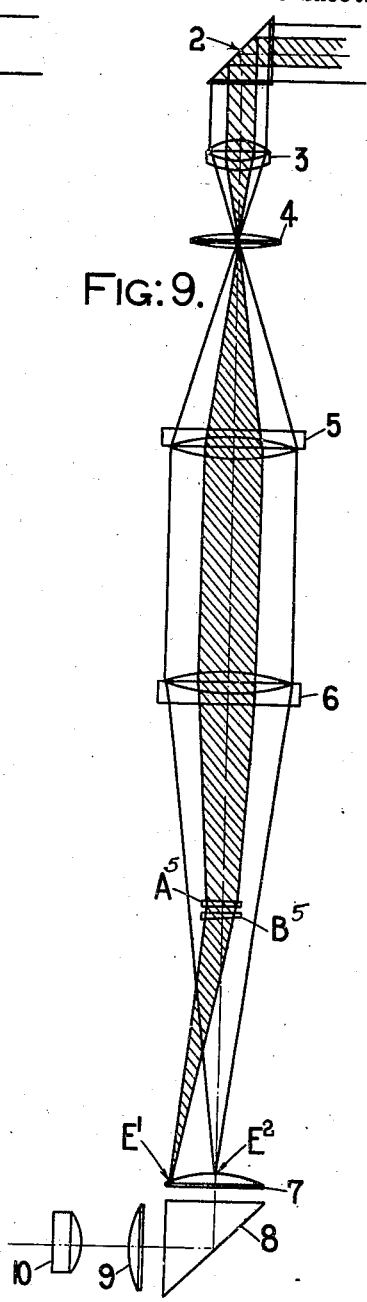
INVENTOR
John M. Strang
BY
William A. Smith Jr.
ATTORNEY Oct. 18, 1927.  
J. M. STRANG  
1,645,880  
PERISCOPE, TELESCOPE, AND LIKE OBSERVATIONAL INSTRUMENT  
Filed Oct. 29, 1924    5 Sheets-Sheet 5
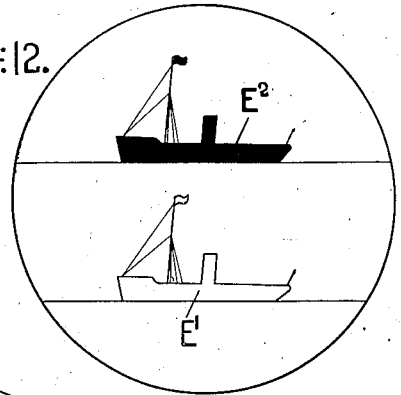
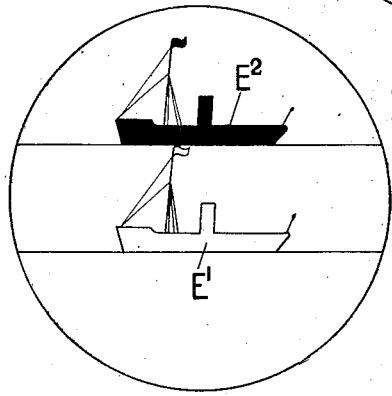
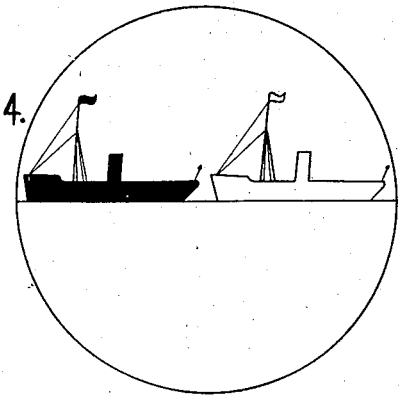
John M. Strang, INVENTOR
BY William A. Smith, Jr.
ATTORNEY Patented Oct. 18, 1927.

1,645,880

UNITED STATES PATENT OFFICE.

JOHN MARTIN STRANG, OF GLASGOW, SCOTLAND, ASSIGNOR TO BARR AND STROUD LIMITED, OF GLASGOW, SCOTLAND.

PERISCOPE, TELESCOPE, AND LIKE OBSERVATIONAL INSTRUMENT.

Application filed October 29, 1924, Serial No. 746,556, and in Great Britain November 6, 1923.

This invention, which refers to periscopes, telescopes, and like observational instruments, hereinafter referred to generally as periscopes, used for the measurement of angles subtended by a base distant from the periscope, relates to periscopes of the single entry beam type, that is, of the type in which light enters as a single undivided beam and passes axially to a system of prisms which cause the beam to be divided into two portions whereby two images are formed, prisms of the prisms system being relatively movable, rotationally or angularly, about the axis of the periscope for producing relative displacement of the two images for the measurement of angles. For an example of this type of periscope see specification of United States Patent No. 1,529,225.

In periscopes of the single entry beam type as previously known the system of prism for dividing the beam has been located in a region where rays of the beam are parallel, and as the conditions appertaining to a beam of parallel rays differ from those appertaining to a beam the rays of which are not parallel, say convergent, a system of prisms which is suitable for a parallel beam is not suitable for a convergent beam, principally because focus of the images is not affected when a parallel beam is being dealt with, whereas focus of the images would be affected if the same system of prism was used in a convergent beam.

The principal object of the present invention is to provide prism systems for use in periscopes of the single entry beam type suitable for location within a periscope at or in a region where rays of the beam of light are convergent (positively convergent passing to a focal point or negatively convergent (divergent) passing from a focal point), the system of prisms being formed to divide the beam into two portions for the production of two images, and formed to cause the two images to lie in one and the same focal plane.

In periscopes according to this invention a principal image and a complementary image may be formed, of which the complementary image is an immovable image.

The complementary image may be an immovable image, an undeviated image, produced by the optical parts of the periscope, or an immovable image deviated by a prism or prisms of the system, or an image capable of being moved by deviation. Further, a system of prisms may be provided capable of producing a zero indication in which the principal and complementary images coincide.

By this invention, amongst other advantages, small prisms can be used, due to the fact that a portion of the convergent beam may generally be chosen where the cross-sectional area is small. With the space ordinarily available provision may be made for switching the prisms out of the beam when not required for use, thus saving the loss of light which otherwise would occur. Considerable latitude in choosing the most suitable place for the system of prisms is obtained as it may be located at any place where a convergent part of the beam occurs. For example, a system of prisms may be placed comparatively near to the eyepiece end of the periscope. The length of the actuating rods is thus small.

For measurement of angles prisms of a prism system are moved relatively, rotationally or angularly, so as to impart to the images relative movement in one transverse direction, and if observations of angular magnitude are to be made either in a vertical, horizontal, or inclined direction, prisms of the prism system are arranged to be adjusted so as to cause the movement of the images to be imparted in the required transverse direction, for example, by rotation bodily together or by altering the axis about which rotation is performed.

Some examples of systems of prisms and their application according to this invention will now be described with reference to the accompanying drawings, in which :—

Figure 1 is a diagram illustrating in longitudinal axial section a first system of prisms, and Figure 2 is a similar diagram illustrating modified conditions and introduced for purposes of explanation.

Figure 3 is a diagram illustrating in longitudinal axial section a second system of prisms.

Figure 4 is a diagram illustrating in longitudinal axial section a third system of prisms.

Figure 5 is a diagram illustrating in longitudinal axial section a fourth system of prisms.

Figure 6 is a diagram illustrating in longitudinal axial section a fifth system of prisms.

Figure 7 is a diagram illustrating in longitudinal axial section a sixth system of prisms.

Figure 8 is a diagram illustrating in longitudinal axial section a seventh system of prisms.

Figure 9 is a diagram illustrating optical parts of a periscope provided with a system of the prisms.

Figure 10 is a diagram illustrating optical parts of a periscope to be referred to.

Figure 11 is a diagram illustrating a system of the prisms and associated mechanism.

Figure 12 is an illustration of a field showing images as may be produced with the use of a system of prisms and viewed by an observer, for observation of angular magnitude in a vertical direction.

Figure 13 is a corresponding illustration showing the images after prisms of the system have been moved by relative rotation.

Figure 14 is an illustration similar to Figure 12, for observation of angular magnitude in a horizontal direction.

In Figure 1 a system of prisms is illustrated consisting of two refracting prisms A and B of equal refracting powers placed in series in a convergent portion of the beam of a periscope. This portion of the beam as illustrated is positively convergent. Each prism is surrounded in its own plane by a second prism, F and G respectively, of comparatively small refracting power. Each central prism may be conveniently mounted on its surrounding prism and be rotated with it. The thickness of each central prism and of its surrounding prism should be substantially the same so that there be no appreciable difference of focus between the images produced by the rays passing through the central prisms A, B, and surrounding prisms F, G, respectively.

The object of making the surrounding prisms F, G, with a small refracting angle is to enable the zero position to be attained. This will be understood with reference to Figures 1 and 2. In Figure 2 the prisms A and B are shown in their zero position for measurement of angles in a plane perpendicular to the paper, i. e. their maximum deviations are in the plane of the paper and are oppositely placed. It will be seen that there is a lateral shift of the axis of the beam passing through the prisms A and B, the amount of the shift depending on the inclination of the faces of these prisms to the axis, their thickness, and the thickness of the air-space between them. The image produced by light passing through the central prisms A and B is consequently shifted from C to D in the plane of the paper. If, as shown in Figure 2, the surrounding prisms F' and G' are parallel pieces of glass, the complementary image will remain at C on the axis and there will, therefore, be, as shown in Figure 2 two images in the field of view and consequently no means of attaining a true zero position. If, however, the surrounding prisms F and G are made with a slight refracting angle, as shown in Figure 1, it will be seen that it is possible to deviate the image produced by them to the point D so that only one image will be seen in the field of view at the zero position.

If desired, one of the surrounding prisms may be made parallel and all the correcting refraction may be made on the other surrounding prism.

Instead of two surrounding (or central) prisms, we may employ only one surrounding (or central) prism, its thickness being substantially equal to the combined thickness of the two central (or surrounding) prisms.

Another alternative way of carrying out the invention is to make one of the central prisms with a slightly greater refracting power than the other. In Figure 3 this arrangement is shown, the prism $B^3$ having slightly stronger refraction than $A^3$. Consequently, the axial ray which has been shifted laterally to E will not emerge parallel to the axis but may be turned back to form the image at C on the axis. The surrounding prisms $F^3$, $G^3$ in this case may be made parallel.

Instead of allowing at the zero position lateral shift of the beam forming the principal image to take place in its passage through the system of prisms, the system may be so arranged that no such lateral shift occurs. One way of carrying this out is illustrated in Figure 4. In this case the central prisms, $A^4$ and $B^4$, are placed with their outer surfaces perpendicular to the axis of the beam and the air space between them is reduced to an extremely small quantity. If the prisms are of equal refracting power and are rotated about an axis X X, perpendicular to the inclined surface of each, there will then be no appreciable shift of the image in the zero position. This may be done by mounting each central prism in a spider like holder which can be rotated about the proper axis. In this case the surrounding prisms may be combined into one parallel prism K having its thickness substantially equal to the combined thickness of prisms $A^4$ and $B^4$ and remaining stationary when the prisms $A^4$ and $B^4$ are rotated about the axis X X. Thus, for measurement of angles prisms $A^4$ and $B^4$ only require to be rotated, and to enable observations to be made in various transverse directions, the adjustment required in this case would involve altering the position of the axis X X. As illustrated, the directon in which the principal image would move transversely is in the plane containng the axis X X and the axis of the beam, and the adjustment to be made would be by rotation of that plane about the central axis of the beam, the axis X X remaining unmoved in the plane.

Instead of causing the central prisms to produce the principal image, we may make the surrounding prisms of comparatively strong refracton and the central prisms either of comparatively weak refraction or parallel, according to which of the above alternative methods is adopted.

Instead of using two central prisms and two surrounding prisms, it is possible to use two prisms alone covering any suitable portion of the beam. For instance, in Figure 5 prisms $A^5$ and $B^5$ are shown covering the central portion of the beam and in Figure 6 prisms $A^1$ and $B^1$ are shown covering a portion surrounding a central portion of the beam. In order to eliminate the difference in focus between the principal image and the complementary image, a small curvature may be given to one or more of the surfaces of the prisms. This will have the effect of magnifying the principal image produced through the prisms by an amount slightly different from the complementary image. If, however, the prisms are thin, the amount of this curvature will not be sufficient to give appreciable errors due to this difference of magnification. In the arrangement Figure 5 each prism may conveniently be carried by a spider-like frame.

Instead of using the refracting prisms in series as in the above methods, they may be arranged concentrically in the same plane. The method of carrying this out is indicated in Figure 7. In this arrangement central prism $A^7$ may be mounted in a spider-like frame and may be rotated in the opposite direction to prism $B^7$ for the measurement of angles. In such a case, if the prisms are of equal refraction there will only be one image at the zero position, which is the position shown in Figure 7. Also there will be no difference in focus between the principal and complementary images. There will be a displacement of the whole field of view, which may be a serious disadvantage if the prisms are of strong refraction. This difficulty may be overcome by inserting a compensating stationary prism in series with the two prisms. Thus, as shown in Figure 8, a compensating prism H, having a refraction substantially equal and opposite to that of either of the measuring prisms in their zero position, may be provided to cover the whole beam. With such an arrangement there will be only one image in the zero position and there will be no displacement of the field.

Figure 9 illustrates by way of example paths which the light may take in passing through the optical parts of a periscope furnished with prisms as illustrated at Figure 5. Thus, a beam of light coming from a distant object entering the prism 2 at the head of the periscope is reflected at right angles downwards through an objective 3, collector lens 4, and objectives 5 and 6. On reaching the refracting prisms system composed of the prisms $A^5$ and $B^5$, the beam is divided into two portions, one portion passing through the refracting prisms system, the other passing clear of them. The beam then passes as two separate portions through the remaining optical parts of the system, namely, collector lens 7, prism 8, field lens 9, and eye lens 10. The thick edges of prisms $A^5$ and $B^5$ are shown as both being towards the one side of the instrument and therefore each prism deviates the light in the same direction. The result is that the portion of the beam of light which passes through the prisms will form a principal image of the object at $E^1$ in a different position from the complementary image formed at $E^2$ by the portion of the beam which does not pass through the prisms.

In this case the images seen would be as indicated in Figure 12, and in order to measure the angle subtended by, say, the distance between the top of the mast of the ship and the waterline, the refraction requires to be reduced so as to bring the top of the mast in the deviated image $E^1$ to touch the waterline in the complementary image $E^2$ as indicated at Figure 13, to accomplish which the prisms $A^5$ and $B^5$ require to be rotated in opposite directions. The angular position of the prisms relative to their zero position then gives a measure of the angle subtended.

Figure 14 indicates the position of the images when measurements of angle in the horizontal plane are to be made.

Some other positions which prisms systems may occupy according to this invention are indicated in Figure 10 by dotted lines P, $P^1$, $P^2$ or $P^3$. At positions P, $P^2$, the portions of the beam are positively convergent and at positions $P^1$, $P^3$, are negatively convergent.

In Figure 11 the prisms $A^5$ and $B^5$ of a system are mounted capable of rotation in a carrier R. Each prism is provided with a holder toothed about its periphery to mesh with pinions S and T, connected to rotate with helical pinions $S^1$ and $T^1$, respectively. The pinions $S^1$ and $T^1$, which are of opposite hand, gear each with a complementary helix $S^2$ $T^2$ capable of rotation and movement endwise. For these purposes a head 11 is provided for imparting rotation, and for endwise movement a circular rack 12 in mesh with a pinion 13. By operating 13 the prisms are rotated relatively in opposite directions and by 11 rotated bodily together. A scale 14 is provided to rotate with the pinion 13.

The carrier R is pivoted to turn about an axis at 15 being operated by connection with a rack 16 and pinion 17. A fixed segment Y is provided having a single tooth 18 to engage with teeth of the prism holders to prevent their rotation when removed from gear with the pinions S, T.

I claim:—

1. An angle measuring periscope of the single entry beam type having optical parts for causing rays of the beam of light to be convergent, a system of prisms within the periscope located in a region where rays of the beam of light are convergent, the system of prisms being formed to divide the beam into two portions, for producing two images, and formed to cause the two images to lie in one and the same focal plane, one a principal image, the other a complementary image, and for deviating the principal image having prisms of the system relatively movably rotationally angularly about an axis extending longitudinally in the beam.

2. An angle measuring periscope of the single entry beam type having optical parts for causing rays of the beam of light to be convergent, a system of prisms within the periscope located in a region where rays of the beam of light are convergent, the system of prisms being formed to divide the beam into two portions for producing two images, and formed to cause the two images to lie in one and the same focal plane, means for imparting to prisms of the system relative rotary movements for measurement of angles, and means for adjusting prisms of the system to enable observations to be made in various lateral directions.

3. An angle measuring periscope of the single entry beam type having optical parts for causing rays of the beam of light to be convergent, a system of prisms within the periscope located in a region where the beam of light is convergent, the system of prisms being formed to divide the beam into two portions, for producing two images and formed to cause the two images to lie in one and the same focal plane, one a principal image, the other a complementary image, and for deviating the principal image having prisms of the system relatively movable rotationally angularly about an axis extending longitudinally in the beam, and by which a zero indication is capable of being produced in which the principal and complementary images coincide, for the purposes set forth.

4. An angle measuring periscope of the single entry beam type having optical parts for causing rays of the beam of light to be convergent, a system of prisms within the periscope located in a region where rays of the beam of light are convergent, the system of prisms being formed to divide the beam into two portions, for producing two images, and formed to cause the two images to lie in one and the same focal plane, the two images being one a principal image, the other a complementary image, the complementary image being an undeviated image and the principal image being capable of deviation, for the purposes set forth.

5. An angle measuring periscope of the single entry beam type having optical parts for causing rays of the beam of light to be convergent, a system of prisms within the periscope located in a region where rays of the beam of light are convergent, the system of prisms being formed to divide the beam into two portions, for producing two images, and formed to cause the two images to lie in one and the same focal plane, the two images being one a principal image in the production of which the prisms of the system are used, the other a complementary image produced by optical parts of the periscope, and the principal image being capable of deviation, for the purposes set forth.

6. An angle measuring periscope of the single entry beam type having optical parts for causing rays of the beam of light to be convergent, a system consisting of two prisms within the periscope located in a region where rays of the beam of light are convergent, the system of prisms being formed to divide the beam into two portions for producing two images and formed to cause the two images to lie in one and the same focal plane, and means for imparting to the prisms relatively rotary movements, for the purposes set forth.

7. An angle measuring periscope of the single entry beam type having optical parts for causing rays of the beam of light to be convergent, a system consisting of two prisms placed in series within the periscope located in a region where rays of the beam of light are convergent, the prisms covering a portion of the beam, the system of prisms being formed to divide the beam into two portions for producing two images and formed to cause the two images to lie in one and the same focal plane, and means for imparting to the prisms relatively rotary movements, for the purposes set forth.

8. An angle measuring periscope of the single entry beam type having optical parts for causing rays of the beam of light to be convergent, a system consisting of two prisms within the periscope located in a region where rays of the beam of light are convergent, the prisms covering a central portion of the beam, the system of prisms being formed to divide the beam into two portions for producing two images and formed to cause the two images to lie in one and the same focal plane, and means for imparting to the prisms relatively rotary movements, for the purposes set forth.

9. An angle measuring periscope of the single entry beam type having optical parts for causing rays of the beam of light to be convergent, a system consisting of two prisms within the periscope located in a region where rays of the beam of light are convergent, the prisms of the system having a small curvature given to one or more surfaces of the prisms, and means for imparting to the prisms relatively rotary movements, for the purposes set forth.

10. An angle measuring periscope of the single entry beam type having optical parts for causing rays of the beam of light to be convergent, a system consisting of two prisms placed in series within the periscope located in a region where rays of the beam of light are convergent, the prisms covering a portion of the beam, the prisms of the system having a small curvature given to one or more surfaces of the prisms, and means for imparting to the prisms relatively rotary movements, for the purposes set forth.

11. An angle measuring periscope having optical parts for causing rays of the beam of light to be convergent, a system of prisms within the periscope located in a region where rays of the beam of light are convergent, mechanism for rotating prisms of the system in opposite directions relatively to one another and together bodily comprising two helices of opposite hand and two helical pinion wheels of opposite hand, the helices capable of rotation and endwise movement being arranged to mesh with the helical pinions in complementary pairs, one with each, the helical pinions being adapted to rotate the prisms, for the purposes set forth.

JOHN MARTIN STRANG.